United States Patent [19]

Ichikawa

[11] Patent Number: 4,457,451
[45] Date of Patent: Jul. 3, 1984

[54] APPARATUS FOR FEEDING ELECTRIC CIRCUIT ELEMENTS

[75] Inventor: Iwao Ichikawa, Yokohama, Japan
[73] Assignee: Sony Corporation, Tokyo, Japan
[21] Appl. No.: 304,168
[22] Filed: Sep. 21, 1981
[30] Foreign Application Priority Data Sep. 29, 1980 [JP] Japan .................... 55-138650[U]
Dec. 29, 1980 [JP] Japan ........................ 55-188038
Dec. 29, 1980 [JP] Japan ........................ 55-188040

[51] Int. Cl.³ .................... B65G 59/06; B65D 83/02
[52] U.S. Cl. ................................. 221/190; 221/200
[58] Field of Search ............ 221/172, 186, 190, 200, 221/204, 202, 254, 298, 299, 183

[56] References Cited
U.S. PATENT DOCUMENTS 969,330  9/1910  Bloch .................... 221/202
1,281,920 10/1918 Ericson .................. 221/200
1,857,815  5/1932  Lafferty ................. 221/172

Primary Examiner—Joseph J. Rolla
Assistant Examiner—Charles C. Compton
Attorney, Agent, or Firm—Lewis H. Eslinger; Alvin Sinderbrand

[57] ABSTRACT

An apparatus for feeding electric circuit elements has a hopper for accommodating a supply of such elements, a capture tube or pipe extending substantially vertically through a bore in the bottom of the hopper which is movable relative to the tube in the direction of the axis of the latter so that the electric circuit elements in the hopper are captured one at a time by the tube and fed therethrough to a predetermined position at the outside of the hopper, and a separating plate disposed above the opening of the tube in the hopper for shielding the electric circuit elements under the separating plate from at least part of the weight of the electric circuit elements thereabove whereby the hopper can be provided with a large vertical dimension for accommodating a correspondingly large supply of the electric circuit elements without the danger that elements near the bottom of the hopper will be damaged by reason of the relative movement of the capture tube under the weight of the superposed circuit elements. Jamming or bridging of the electrical circuit elements above or around the opening to the capture tube is avoided by providing the bottom of the hopper with a conically concave inner surface having a plurality of protuberances thereon, and further by providing a rod extending through the bottom of the hopper and being stationary relative to the capture tube so that the hopper is also movable relative to such rod which has a resilient member extending laterally therefrom over the opening to the capture tube.

4 Claims, 3 Drawing Figures

APPARATUS FOR FEEDING ELECTRIC CIRCUIT ELEMENTS

BACKGROUND OF THE INVENTION

1. Field of the Invention

This invention relates to an apparatus for feeding electric circuit elements, for example, chip-shaped elements, from a supply thereof.

2. Description of the Prior Art

A hybrid integrated circuit usually includes a circuit board on which chip-shaped electric circuit elements of various kinds are mounted for forming an electric circuit. The present applicant has proposed, for example, in the laid-open Japanese Patent Application identified as No. 151,434/1980, an apparatus for feeding electric circuit elements to be used in manufacturing such hybrid integrated circuits. Such proposed feeding apparatus includes a hopper for containing a supply of the electric circuit elements, capture means slidably inserted in a bore extending through the bottom of the hopper and having an axially hole through the capture means so that, when the hopper and capture means are subjected to relative reciprocal movement, the electric circuit elements in the hopper are captured, one at a time, by the hole of the capture means and are fed therethrough to a predetermined position outside of the hopper. In the foregoing apparatus, it is desirable that the hopper accommodate a large number of the circuit elements so as to reduce the frequency with which the supply of electric circuit elements has to be replenished. Thus, it is desirable to provide a large capacity hopper which, in the case of a cylindrical hopper having its axis directed vertically, involves providing the hopper with a large diameter and/or axially height. However, when it is desired to feed various kinds of electrical circuit elements in parallel at the same time, it is necessary to provide a corresponding number of hoppers for the respective kinds of circuit elements and, if the diameter of each hopper is increased for accommodating a large supply of the respective circuit elements therein, the feeding apparatus, as a whole, will require a correspondingly large planar space. On the other hand, if the axially height of each cylindrical hopper is increased so as to permit the latter to contain a large supply of the respective electric circuit elements without unduly increasing the planar space required for the feeding apparatus, then circuit elements disposed in the lower portion of the hopper will be substantially stressed by the weight of the large number of circuit elements positioned thereabove. In such case, there is the danger that circuit elements at the bottom of the hopper may be damaged as a result of the relative movements of the hopper and capture means while the circuit elements contacted by the capture means are subjected to the excessive weight of the electric circuit elements thereabove.

Further, if each hopper is made slender by decreasing its diameter in order to reduce the planar space required for the feeding apparatus, circuit elements within the hopper may interengage in such a way as to form bridges or jams across the hopper so that, as the capture means removes the circuit elements one at a time from the bottom of the hopper, a void or empty space may be created in the bottom portion of the hopper in the region of the capture means so that the feeding of electric circuit elements from the hopper will be interrupted or stopped.

Moreover, in the case of electric circuit elements of the type used for manufacturing hybrid integrated circuits, the outer surfaces thereof, with the exception of the electrode portions at the opposite ends, are coated with a resin. Since the bottom of the hopper of the previously mentioned proposed apparatus has a smooth conically concave surface, the resin coatings on the electric circuit elements can cause the latter to adhere to the bottom of the hopper and to each other in layers. Such adherence of the circuit elements to each and to the inner surface of the hopper bottom interferes with the smooth feeding of the circuit elements and prevents the feeding of the last of the circuit elements that may be contained in the hopper.

OBJECTS AND SUMMARY OF THE INVENTION

Accordingly, it is an object of the present invention to provide an improved apparatus for feeding electric circuit elements which is free of the above mentioned defects or problems associated with the previously proposed feeding apparatus.

Another object of this invention is to provide a feeding apparatus which can accommodate a large supply of electric circuit elements in its hopper without requiring excessive planar space for installation of the feeding apparatus.

Still another object is to provide a feeding apparatus, as aforesaid, which is capable of the smooth feeding of electric circuit elements from its hopper.

A further object of this invention is to provide a feeding apparatus having a hopper of large capacity obtained by increasing the vertical dimension thereof, and wherein damage to electric circuit elements within the hopper is avoided, particularly at the bottom portion of the hopper.

A still further object of this invention is to provide a feeding apparatus, as aforesaid, in which bridging or jamming of electric circuit elements within the hopper is avoided as the elements are withdrawn one at a time from the bottom of the hopper, thereby ensuring that the supply of the electric circuit elements can be fully fed from the hopper.

Still another object of the invention is to provide a feeding apparatus, as aforesaid, in which adherence of the electric circuit elements in layers to the bottom of the hopper is avoided for permitting the smooth feeding of the last of the circuit elements from the hopper.

In accordance with an aspect of this invention, an apparatus for feeding electric circuit elements comprises a hopper for accommodating a supply of the electric circuit elements and having a bottom with a bore extending therethrough, capture means extending through such bore, with one of the hopper and the capture means be movable relative to the other in the direction of the axis of the bore so that the electric circuit elements in the hopper are captured one at a time by the capture means and fed thereby through the bore to a predetermined position outside the hopper, and a separating plate disposed above the capture means in the hopper for shielding the electric circuit elements under such separating plate from at least part of the weight of the electric circuit elements thereabove.

In a preferred embodiment of the invention, a rod-like member is disposed in the lower portion of the hopper and is movable relative to the latter upon the relative movement of the hopper and capture means so as to avoid the interengaging of the electric circuit elements that would cause bridges thereof to extend across the hopper above the capture means so as to interfere with the smooth feeding of the circuit elements from the hopper.

The above, and other objects, features and advantages of the invention, will be apparent from the following detailed description of an illustrative embodiment which is to be read in connection with the accompanying drawings.

DESCRIPTION OF THE PREFERRED EMBODIMENT

Figure 1:
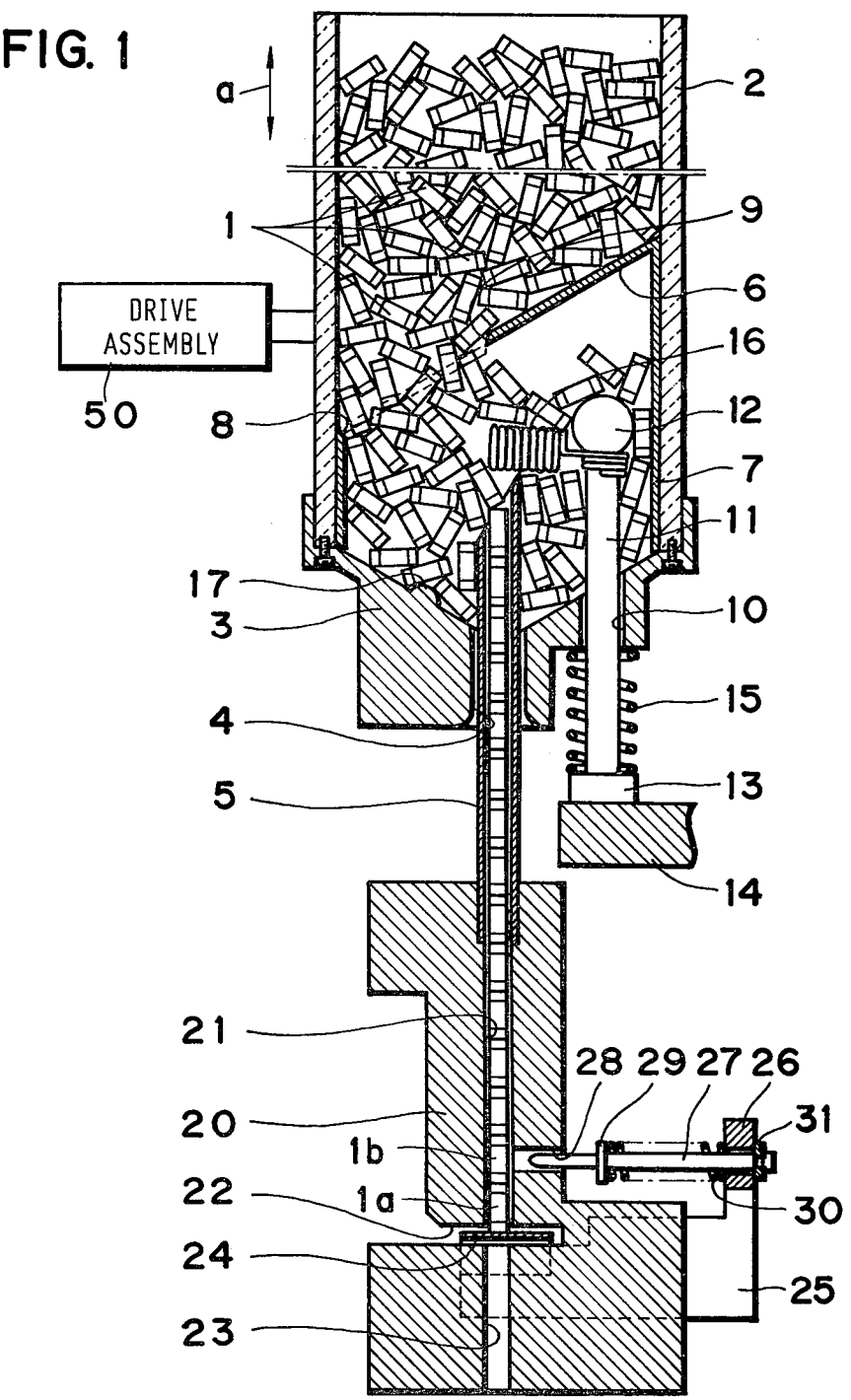
FIG. 1 is a partly schematic vertical sectional view of an apparatus for feeding electric circuit elements according to an embodiment of this invention.

Referring to the drawings in detail, and initially to FIG. 1 thereof, it will be seen that an apparatus according to this invention for feeding electric circuit elements 1 is comprised of a hopper 2 constituted by a vertically arranged, relatively long cylindrical container. Such cylindrical container or side wall of hopper 2 is desirably formed of a transparent synthetic resin so that the supply of electric circuit elements 1 in the hopper is clearly visible from the exterior. The hopper is further shown to have a bottom 3 formed with a conically concave inner or upper surface. Bottom 3 is also shown to be formed with a central, vertically directed bore 4 extending axially therethrough, and such bore 4 has a capture tube or pipe 5 slideably extending therethrough. The capture tube or pipe 5 has an oblique upper end edge within hopper 2 so as to define an opening for receiving electric circuit elements 1, which opening is directed laterally toward one side of the hopper. With the foregoing arrangement, when hopper 2 and pipe or tube 5 are moved axially relative to each other in a reciprocating manner, for example, as indicated by the double-headed arrow a on FIG. 1, the electric circuit elements 1 in hopper 2 are captured one at a time by capture pipe or tube 5 and transmitted through the interior of the latter to a position outside the hopper. In the case where the electric circuit elements 1 are of elongated cylindrical configuration, as shown, capture pipe or tube 5 has an inner diameter smaller than the length of each of the electric circuit elements and slightly larger than the outer diameter of the latter. In such case, the captured circuit elements 1 will be aligned with the longitudinal direction within pipe or tube 5, as shown on FIG. 1. For effecting the relative movements of hopper 2 and capture pipe or tube 5, the latter can be fixed or stationary, while hopper 2 is suitably mounted or guided for vertical movement in response to operation of a reciprocating or vibratory drive assembly indicated schematically at 50 on FIG. 1.

In accordance with the present invention, the above described feeding apparatus is further provided with a separating plate 6 which is disposed in hopper 2 above capture pipe or tube 5. In the illustrated embodiment of the invention, separating plate 6 is inclined downwardly, preferably from the side of hopper 2 which is opposite to the side thereof toward which faces the oblique upper end edge of capture pipe or tube 5. Further, separating plate 6 extends across only a portion of the cross-section of hopper 2. Thus, in the case where the side wall of hopper 2 is cylindrical and capture pipe or tube 5 is coaxial or centered in respect to the hopper, separating plate 6 is preferably substantially semi-circular so as to have a chordal edge extending across the hopper above the pipe or tube 5. For supporting separating plate 6 in the desired position within hopper 2, there is provided a cylindrical support 7 fitting closely within the cylindrical side wall of the hopper 2 and having an oblique upper end, with separating plate 6 extending across the upper portion of such oblique upper end, as shown on FIGS. 1 and 2. Cylindrical support 7 with separating plate 6 integral therewith, may be inserted within hopper 2 from the top of the latter until the lower end edge of support 7 rests on bottom 3. The edge 8, at the portion of the upper end of cylindrical support 7 other than that to which separating plate 6 is secured, and the chordal edge 9 of the separating plate are beveled so as to prevent the hang-up of any of the electric circuit elements 1 on such edges.

Further, in accordance with this invention, the bottom 3 of the hopper has at least one other hole 10 extending therethrough at a location spaced laterally from the center of the hopper and slideably receiving a respective rod-like, relatively movable member 11. The upper end of rod-like member 11 is disposed below separating plate 6 within the hopper and is in the form of a ball 12. The lower end of rod-like member 11 extends below bottom 3 and has a flange 13 thereon which is adapted to seat on a fixed abutment 14, and a helical compression spring 15 extends around rod-like member 11 between flange 13 and bottom 3 of the hopper. Spring 15 urges flange 13 on rod-like member 11 into engagement with fixed abutment 14 to resist movements of member 11 while hopper 2 is vertically reciprocated in respect thereto. A resilient member 16, for example, in the form of a coil spring, as shown, is secured on rod-like member 11 immediately below ball 12 and extends substantially normal to the axis of rod-like member 11 so as to be disposed diametrically in the lower portion of the hopper above the upper end of capture pipe 5.

Figure 2:
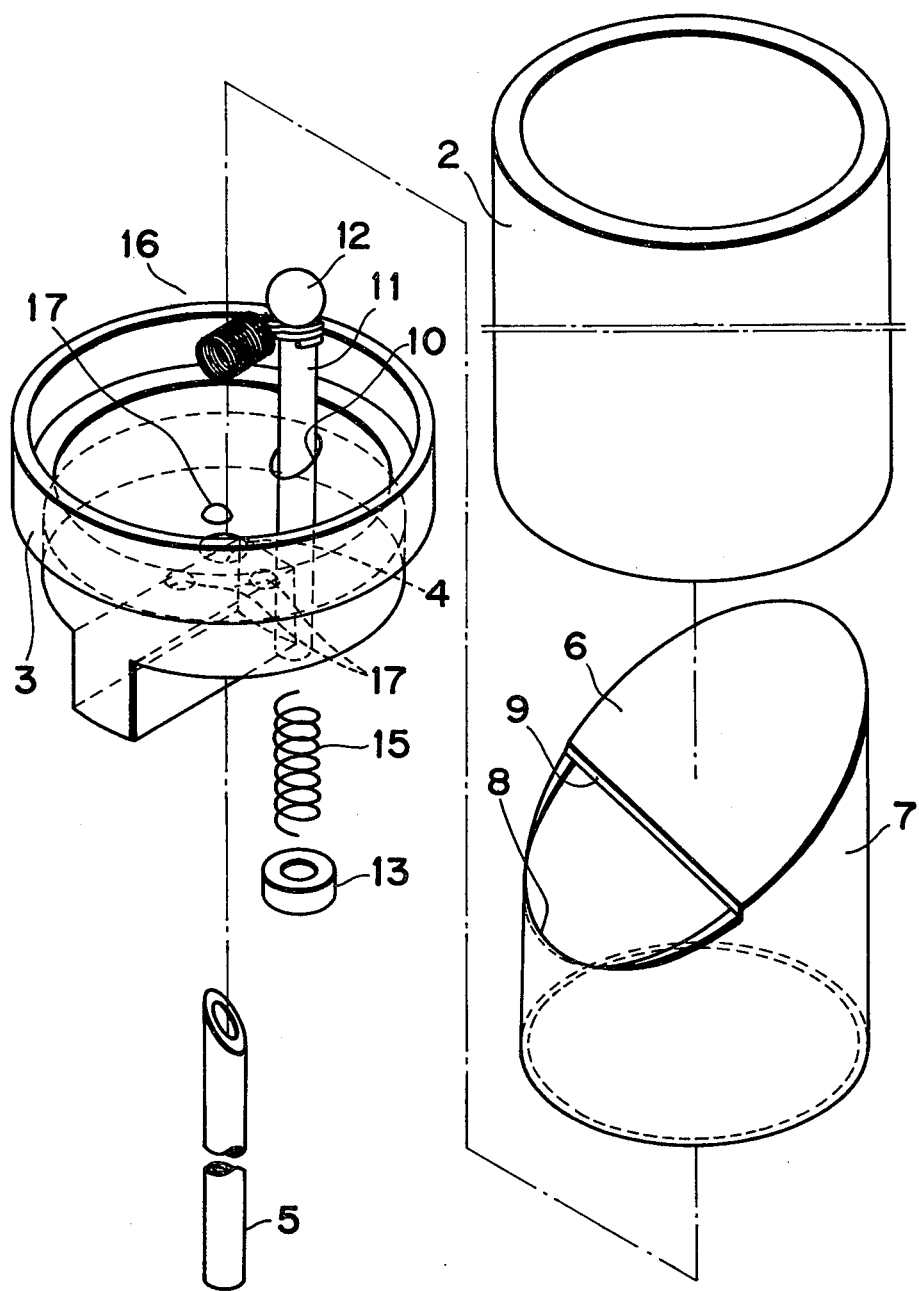
FIG. 2 is an exploded perspective view showing major components of the feeding apparatus of FIG. 1.

The conically concave inner surface of bottom 3 of the hopper is preferably formed with a plurality of generally semi-spherical protuberances 17, as particularly shown on FIGS. 1 and 2. The protuberances 17 may be formed integrally with bottom 3, for example, when molding the latter of a synthetic resin having a low coefficient of friction, such as, polytetrafluoroethylene. Alternatively, protuberances 17 may be formed by embedding balls into respective recesses or holes in bottom 3. The protuberances 17, which may be three in number, as shown, are arranged at random about the center of the inner surface of bottom 3. In the case where electric circuit elements 1 are cylindrical and have a diameter of 2.2 mm and a length of 5.9 mm, it is suitable to provide each protuberance 17 with a diameter of 6.0 mm and a projecting height of about 3.0 mm.

Figure 3:
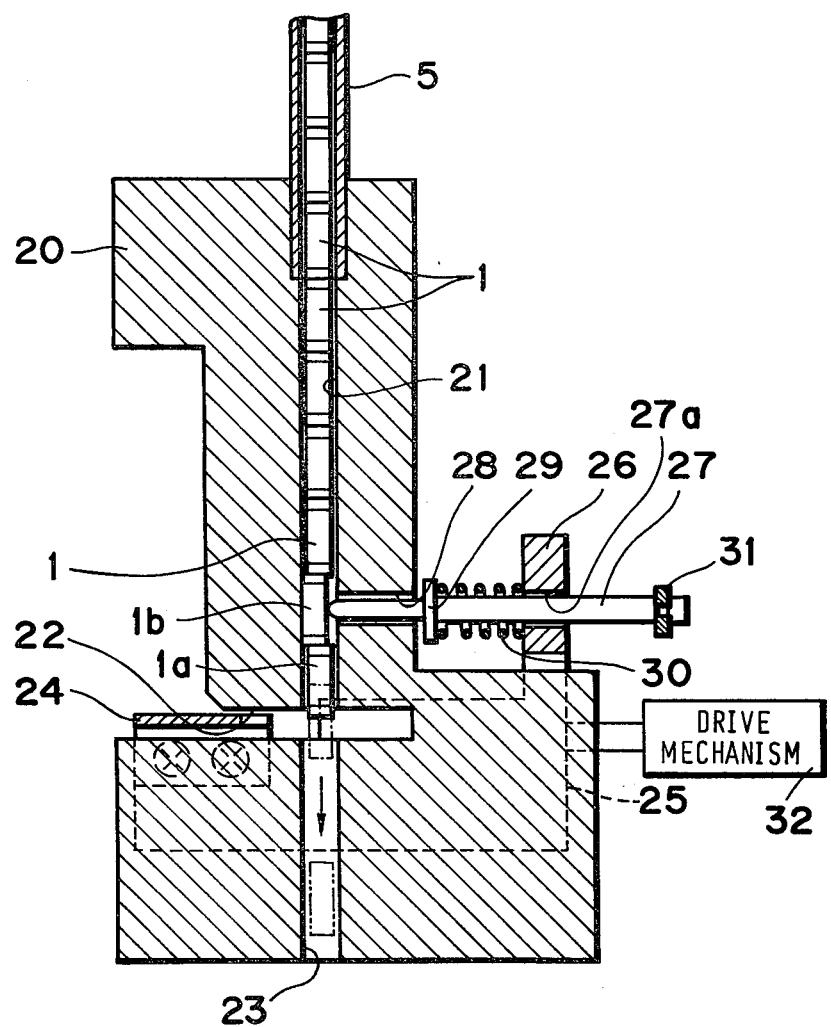
FIG. 3 is an enlarged vertical sectional view of a portion of the apparatus shown on FIG. 1, but showing a shutter thereof in its open state.

As shown particularly on FIGS. 1 and 3, a suitably fixed supporting block 20 is mounted below the hopper and is formed with a vertical bore or passage 21 having an enlarged diameter upper end portion for receiving and mounting the lower end portion of capture pipe or tube 5. Apart from such upper end portion, the remainder of bore or passage 21 has a diameter which is the same as the inner diameter of capture pipe 5. A horizontal slot 22 extends laterally in a lower portion of supporting block 20, and the lower end of bore 21 opens at the roof of slot 22. An exit passage 23 which is axially aligned with bore 21 extends through the lower portion of supporting block 20 from slot 22 and opens at the bottom of block 20. A shutter 24 is horizontally movable in slot 22 between a closed position between passages 21 and 23 (FIG. 1) and an opened position (FIG. 3). Shutter 24 is secured to a movable frame 25 which is disposed in back of supporting block 20 and suitably mounted for rectilinear movement parallel to the direction of the desired movement of shutter 24 between its opened and closed positions. An arm 26 projects forwardly from an end portion of frame 25 and has a hole 27a extending horizontally therethrough for slideably accommodating an elongated pin 27. An end portion of pin 27, which is preferably rounded at its end, extends slideably in a horizontal bore 28 formed in supporting block 20 so as to intersect or open into vertical bore or passage 21. The vertical position of horizontal bore 28 is selected so that, when shutter 24 is in its closed position (FIG. 1) to support the lowermost circuit element 1a in bore or passage 21, the circuit element 1b next thereabove will be disposed at the level of bore 28 so as to be engageable by pin 27 therein, as shown on FIG. 3. A flange 29 is provided on pin 27 adjacent the end portion of the latter extending into bore 28, and a helical compression spring 30 extends around pin 27 between flange 29 and arm 26 for urging pin 27 toward the left relative to arm 26, as viewed on FIGS. 1 and 3. The movement of pin 27 under the urging of spring 30 relative to frame 25 is limited by a retaining ring 31 on pin 27 which is engageable with arm 26. Pin 27 is longitudinally dimensioned so that, when frame 25 is moved toward the right to the position shown on FIG. 1 for disposing shutter 24 in its closed position, arm 26 acts on ring 31 to withdraw pin 27 from bore 21 into horizontal bore 28 so as to avoid any interference with the movement of circuit elements 1 vertically in bore or passage 21. However, as frame 25 is moved toward the left for disposing shutter 24 in its opened position, as shown on FIG. 3, pin 27 is urged by spring 30 axially into passage 21 to grip or bear against circuit element 1b which is next to the bottom in the series of circuit elements within passage 21. Thus, when shutter 24 is moved to its opened position, the lowermost circuit element 1a in passage 21 is released so as to drop through exit passage 23 in support block 20, while the next circuit element 1b is pressed by pin 27 against the inner surface of passage 21 so as to frictionally retain circuit element 1b, and the circuit elements thereabove, within passage 21. Finally, a suitable drive mechanism indicated schematically at 32 on FIG. 3 is connected with frame 25 for horizontally reciprocating the latter so as to move or cycle shutter 24 between its closed and opened positions (FIGS. 1 and 3) and simultaneously to move pin 27 between its released and gripping positions.

The above described circuit element feeding apparatus according to this invention operates as follows:

Initially, a substantial supply of the electric circuit elements 1 is discharged into hopper 2, and drive assembly 50 is operated to effect vertical reciprocating movement of hopper 2 relative to capture pipe or tube 5 and rod-like member 11. By reason of such relative movement, electric circuit elements 1 are successively captured by pipe 5 in their vertically aligned state.

Since separating plate 6 is disposed above capture pipe 5 within hopper 2, circuit elements 1 within the lower portion of hopper 2, and particularly the circuit elements 1 in engagement with the relatively moving capture pipe 5, are shielded by plate 6 from at least part of the weight of the electric circuit elements thereabove. Thus, it is possible to slenderize hopper 2, that is, to make hopper 2 relatively small in diameter and to correspondingly increase its axially size, for accommodating a large supply of the electric circuit elements 1 without the danger that the movement of hopper 2 vertically relative to capture pipe 5 will make likely the damage to those circuit elements contacted by the capture pipe. More particularly, in a practical embodiment of the invention, hopper 2 is provided with an outside diameter of 40 mm and an axial length of 385 mm to accommodate a large supply of the previously dimensioned electric circuit elements while reducing the planar space required for the feeding apparatus. The large supply of circuit elements 1 that can be accommodated within such hopper 2 decreases the frequency with which such supply needs to be replenished by the operator or human overseer of the apparatus.

Since separating plate 6 is inclined downwardly toward its free chordal edge 9, the portion of plate 6 immediately adjacent to the side wall of hopper 2 is higher than the free edge 9 and this ensures that a space devoid of circuit elements 1 will be formed under separating plate 6, as shown on FIG. 1. In other words, the circuit elements 1 can move downwardly past plate 6 only through the opening provided between edge 9 of plate 6 and the edge 8 of support 7 and, after moving through such opening, the circuit elements will not tend to move upwardly into the pocket defined between inclined separating plate 6 and the adjacent support 7. Thus, since separating plate 6 extends over the upper end of capture tube or pipe 5, only a few circuit elements 1 are, in effect, disposed above the upper end of capture pipe 5 as hopper 2 is reciprocated vertically relative to the capture pipe. Therefore, the weight of circuit elements 1 above capture pipe 5 is maintained relatively low to avoid damage to such circuit elements as a result of the relative movement.

Furthermore, as previously noted, flange 13 at the lower end of rod-like member 11 is urged against fixed abutment 14 by spring 15 so that, as hopper 2 is vertically reciprocated, the hopper and the circuit elements 1 in the lower portion of the hopper about capture pipe 5 are moved vertically in respect to rod-like member 11 and the resilient member 16 thereon. Such relative movements ensure that the electric circuit elements 1 within the lower portion of hopper 2 will be continuously agitated and thus will not interengage in such a manner as to constitute a briding formation extending across the slender hopper 2. In the absence of such rod-like member 11 and resilient member 16, there is the danger that, as electric circuit elements 1 are removed successively from the bottom of hopper 2 by capture pipe 5, the circuit elements 1 thereabove would interengage to form a bridging structure below which a cavity deprived of circuit elements 1 would develop to ultimately interrupt the feeding of circuit elements from the hopper. On the other hand, rod-like member 11 and resilient member 16, in continually agitating the electric circuit elements 1 in the lower portion of hopper 2 ensure that, as the circuit elements are successively removed by capture pipe 5, the circuit elements 1 accommodated in the upper portion of hopper 2 move smoothly downwardly into the lower portion of the hopper for continuing the uninterrupted feeding of the circuit elements therefrom. Moreover, rod-like member 11 and resilient member 16 thereon serve to prevent adherence of the electric circuit elements 1 in layers to the conical inner surface of bottom 3. In respect to the foregoing, it will be appreciated that, when circuit elements 1 are coated with a resin, except at the electrode portions at the ends thereof, such circuit elements are apt to be aligned and to form successive layers on the conically concave inner surface of bottom 3. With the circuit elements thus aligned in layers, the resin coatings thereon are apt to adhere to each other and to the surface of bottom 3 with the result that all of the circuit elements will not be removed or fed from the hopper. It will be appreciated that, although only a single rod-like member 11 is shown in the illustrated embodiment of the invention, a plurality of such rod-like members may be provided at different locations about capture pipe 5.

The protuberances 17 extending from the inner surface of hopper bottom 3 ensure that the various circuit elements 1 engaging against the surface of bottom 3 will be randomly oriented, as shown on FIG. 1, and thus will be effectively prevented from adhering in layers to the conical inner surface of bottom 3.

As frame 25 is horizontally reciprocated by drive mechanism 32, the electric circuit elements 1 successively removed from hopper 2 travel downwardly one at a time through capture pipe 5 and passage 21 for discharge through exit passage 23. In other words, for each reciprocating cycle of frame 25, a single electric circuit element 1 is discharged from exit passage 23.

Having described a specific embodiment of this invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. An apparatus for feeding electric circuit elements comprising:
    a hopper for accommodating a supply of said electric circuit elements and having a bottom with a bore extending therethrough;
    capture means extending through said bore and including a substantially vertical tube;
    one of said hopper and said capture means being movable relative to the other in the direction of the axis of said bore so that said electric circuit elements in the hopper are captured one at a time by said capture means and fed thereby through said bore to a predetermined position;
    a separating plate disposed above said capture means in said hopper and inclined downwardly from the side if said hopper which is opposite to said one side and extending across only a portion of the cross-section of said hopper extending from said opposite side, for shielding the electric circuit elements under said separating plate from at least part of the weight of the electric circuit elements thereabove, said vertical tube terminating within said hopper below said separating plate is an oblique end edge so as to define an opening for receiving the electric circuit elements, which opening is directed laterally toward one side of the hopper; and
    at least one rod extending substantially parallel to said tube through said bottom of the hopper and located under said separating plate, said rod and said hopper also being movable relative to each other upon the relative movement of said hopper and said capture means for disrupting any jams of the electric circuit elements that would interfere with the smooth feeding thereof into said tube.

2. An apparatus for feeding electric circuit elements comprising:
    a hopper for accommodating a supply of said electric circuit elements and having a bottom with a bore extending therethrough;
    capture means extending through said bore and including a substantially vertical tube;
    one of said hopper and said capture means being movable relative to the other in the direction of the axis of said bore so that said electric circuit elements in the hopper are captured one at a time by said capture means and fed thereby through said bore to a predetermined position;
    a separating plate disposed above said capture means in said hopper and inclined downwardly from the side of said hopper which is opposite to said one side and extending across only a portion of the cross-section of said hopper extending from said opposite side, for shielding the electric circuit elements under said separating plate from at least part of the weight of the electric circuit elements thereabove, said vertical tube terminating within said hopper below said separating plate in an oblique end edge so as to define an opening for receiving the electric circuit elements, which opening is directed laterally toward one side of the hopper; and
    at least one rod extending substantially parallel to said tube through said bottom of the hopper and located under said separating plate, said rod and said hopper also being movable relative to each other upon the relative movement of said hopper and said capture means, said rod having a resilient element extending laterally from its upper end over said oblique end edge of the tube for disrupting any jams of the electric circuit elements that would interfere with the smooth feeding thereof into said tube.

3. An apparatus according to claim 2; wherein the inner surface of said bottom of the hopper is conically concave, said tube is centered in respect to said bottom, and said inner surface of the bottom has protuberances extending therefrom.

4. An apparatus according to claim 2; wherein said tube and rod are substantially stationary, and said hopper is vertically reciprocated for effecting the relative movement of said hopper in respect to said tube and said rod.

* * * * *